(12) United States Patent
Yeo et al.

(10) Patent No.: US 11,592,610 B2
(45) Date of Patent: Feb. 28, 2023

(54) LIGHT FIXTURE WITH SINGLE EDGE LIT OPTICAL ASSEMBLY

(71) Applicants: Fusion Optix, Inc., Woburn, MA (US); Axis Lighting, Inc., LaSalle (CA)

(72) Inventors: Terence Yeo, Boston, MA (US); Timothy Kelly, Brookline, MA (US); Howard Yaphe, Saint-Laurent (CA); Stephane Beland, Saint-Jean-sur-Richelieu (CA); Jean Gagne, Saint-Lazare (CA); Andrew Miles, Cornwall (CA)

(73) Assignees: Fusion Optix, Inc., Woburn, MA (US); Axis Lighting, Inc., LaSalle (CA)

( * ) Notice: Subject to any disclaimer, the term of this patent is extended or adjusted under 35 U.S.C. 154(b) by 0 days.

(21) Appl. No.: 17/674,326

(22) Filed: Feb. 17, 2022

(65) Prior Publication Data
US 2022/0171119 A1 Jun. 2, 2022

Related U.S. Application Data

(63) Continuation of application No. 17/471,771, filed on Sep. 10, 2021, now Pat. No. 11,333,822, which is a
(Continued)

(51) Int. Cl.
*G02B 6/00* (2006.01)
*F21V 8/00* (2006.01)
(Continued)

(52) U.S. Cl.
CPC .............. *G02B 6/0073* (2013.01); *F21V 7/04* (2013.01); *G02B 6/0036* (2013.01);
(Continued)

(58) Field of Classification Search
CPC ........ G02B 6/0036; G02B 6/38; G02B 6/004; G02B 6/0041; G02B 6/0043;
(Continued)

(56) References Cited

U.S. PATENT DOCUMENTS 7,991,257 B1 * 8/2011 Coleman .............. G02B 6/0036
264/494
8,033,706 B1 * 10/2011 Kelly ................... G02B 6/0043
362/617
(Continued)

*Primary Examiner* — Gerald J Sufleta, II

(57) ABSTRACT

A light fixture with a single edge lit optical assembly produces various light distributions which provide targeted control of light output with peak intensity that is non-normal to the light guide output face. The compact form factor of light fixture embodiments having narrow width are particularly well-suited for use in linear lighting applications requiring suspended, surface and recessed installations typically used to illuminate walls, floors and/or ceilings. The light fixture can also be selectively configured and oriented during assembly and installation to achieve various lighting distributions including asymmetrical and symmetrical with one or more peak intensities. Optical components within the light fixture are typically positioned and retained in optical alignment with internal support features of a linear housing. The optical assembly typically includes LED board, light guide, and one or more reflectors, and an optically transmitting component further providing a fixture assembler a range of design choices.

32 Claims, 17 Drawing Sheets

Related U.S. Application Data continuation of application No. 15/887,801, filed on Feb. 2, 2018, now Pat. No. 11,156,762.

(60) Provisional application No. 62/453,588, filed on Feb. 2, 2017.

(51) Int. Cl.
*F21V 7/04* (2006.01)
*F21Y 115/10* (2016.01)
*F21Y 103/10* (2016.01)
*F21S 8/06* (2006.01)

(52) U.S. Cl.
CPC ......... *G02B 6/0051* (2013.01); *G02B 6/0058* (2013.01); *F21S 8/06* (2013.01); *F21V 2200/20* (2015.01); *F21Y 2103/10* (2016.08); *F21Y 2115/10* (2016.08); *G02B 6/0055* (2013.01); *G02B 6/0065* (2013.01); *G02B 6/0088* (2013.01)

(58) Field of Classification Search
CPC .. G02B 6/0016; G02B 6/0055; G02B 6/0073; G02B 6/0051; G02B 6/009; G02B 6/0091; G02B 6/0086; F21V 7/04
See application file for complete search history.

(56) References Cited

U.S. PATENT DOCUMENTS

| | | | | |
|---|---|---|---|---|
| 8,430,548 | B1* | 4/2013 | Kelly | G02B 6/0051 362/613 |
| 8,953,926 | B1* | 2/2015 | Kelly | F21V 7/04 362/628 |
| 2003/0210222 | A1* | 11/2003 | Ogiwara | G02B 6/0061 345/103 |
| 2006/0227546 | A1* | 10/2006 | Yeo | G02B 5/0284 362/227 |
| 2008/0266879 | A1* | 10/2008 | Chang | G02B 6/0021 362/330 |
| 2012/0163024 | A1* | 6/2012 | Edamitsu | F21V 5/02 362/611 |
| 2012/0287674 | A1* | 11/2012 | Nichol | G02B 6/0018 264/1.24 |
| 2013/0181246 | A1* | 7/2013 | Wu | F21V 7/28 438/27 |
| 2013/0208495 | A1* | 8/2013 | Dau | G02B 6/0078 362/551 |
| 2014/0126236 | A1* | 5/2014 | Song | G02B 6/0041 362/607 |
| 2014/0211495 | A1* | 7/2014 | Yuan | G02B 6/0035 362/555 |
| 2015/0049511 | A1* | 2/2015 | Tarsa | F21S 8/04 362/611 |
| 2015/0177439 | A1* | 6/2015 | Durkee | G02B 6/0063 362/555 |
| 2016/0047969 | A1* | 2/2016 | Lim | G02B 6/34 362/619 |
| 2016/0329020 | A1* | 11/2016 | Ma | G02B 6/0036 |
| 2017/0097448 | A1* | 4/2017 | Wang | F21V 13/04 |
| 2017/0123134 | A1* | 5/2017 | Moon | G02B 6/0061 |
| 2017/0153007 | A1* | 6/2017 | Banin | F21V 11/00 |
| 2018/0188442 | A1* | 7/2018 | Wang | G02B 6/0065 |
| 2018/0226003 | A1* | 8/2018 | Szekely | G09F 13/04 |
| 2018/0231708 | A1* | 8/2018 | Liu | G02B 6/0065 |
| 2018/0267228 | A1* | 9/2018 | Epstein | G02B 6/0061 |
| 2018/0329129 | A1* | 11/2018 | Tjin | G02B 6/003 |
| 2019/0041318 | A1* | 2/2019 | Wissmann | G01N 21/31 |

* cited by examiner

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| A1 | Surface Features on Inner Face | 4.5 | 18 | M1000 lenticular (Fig. 5) | 2% | Specular |
| A2 | Surface Features on Outer Face | 4.5 | 18 | M1000 lenticular (Fig. 5) | 2% | Specular |
| B1 | Surface Features on Outer Face | 4.5 | 18 | M1000 lenticular (Fig. 5) | 2% | Specular |
| B2 | Surface Features on Inner Face | 4.5 | 18 | M1000 lenticular (Fig. 5) | 2% | Specular |
| C2% | Surface Features on Inner Face | 4.5 | 18 | M1000 lenticular (Fig. 5) | 2% | Specular |
| C5% | Surface Features on Inner Face | 4.5 | 18 | M1000 lenticular (Fig. 5) | 5% | Specular |
| C10% | Surface Features on Inner Face | 4.5 | 18 | M1000 lenticular (Fig. 5) | 10% | Specular |
| C20% | Surface Features on Inner Face | 4.5 | 18 | M1000 lenticular (Fig. 5) | 20% | Specular |
| D | Surface Features on Inner Face | 4.5 | 15 | M1000 lenticular (Fig. 5) | 5% | Specular |

Fig. 3A

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| E1 | Surface Features on outer face (Fig. 14) | 4.5 | 18 | 12-6 pattern (Fig 6 Embodiment E) | 0% | Specular |
|  |  |  |  |  | 2% |  |
| E2 | Surface Features on inner face (Fig. 15) |  |  |  | 5% |  |
|  |  |  |  |  | 8% |  |
| F1 | Surface Features on Outer Face (Fig. 16) |  |  | 6-12 pattern (Fig 6 Embodiment F) | 0% |  |
| F2 | Surface Features on Inner Face (Fig. 17) |  |  |  | 2% |  |
|  |  |  |  |  | 5% |  |
|  |  |  |  |  | 8% |  |
| G | Surface on Inner Face |  |  | ETCHED LIGHT GUIDE | 10% |  |

Fig. 3B

Surface    Surface    Surface    Surface    Surface
Pattern SP1  Pattern SP2  Pattern SP2  Pattern SP3  Pattern SP3

LIGHT FIXTURE WITH SINGLE EDGE LIT OPTICAL ASSEMBLY

RELATED APPLICATIONS

This application is a continuation of and claims the benefit of non-provisional utility application Ser. No. 17/471,771 "Single Edge Lit Lighting Module With Bi-Lobed Light Distribution" filed Sep. 10, 2021 which is itself a continuation of and claims the benefit of non-provisional utility application Ser. No. 15/887,801 titled "Single Edge Lit Lighting Module Producing Tailored Light Distributions" filed Feb. 2, 2018 which itself claims the benefit of provisional patent application Ser. No. 62/453,588 titled "Single Edge Lit Lighting Module Producing Tailored Light Distributions" filed Feb. 2, 2017.

BACKGROUND

The invention relates to edge lit light fixtures which can be used in a variety of applications. In illumination applications it is often desired or required to control the light distribution in such a way as to output light from the fixture face with a greater proportion of light in a non-normal orientation. A batwing type distribution, named for the wing like appearance when shown on a polar plot of intensity vs. angle, is one such light distribution commonly used in down lighting to provide even floor and/or ceiling illumination with a minimal number of fixtures. For general area coverage, a symmetric batwing with two equal lobes along a given orientation axis is typical. For other applications such as targeting light distribution of a down light towards or away from a wall, fully or partially asymmetric light distributions are needed.

SUMMARY

A single edge lit lighting module is disclosed which produces tailored light distributions valuable in many illumination applications. The light distributions attainable using the invention include, but are not limited to, symmetric and asymmetric batwing distributions, asymmetric distributions for perimeter lighting and symmetric distributions. The invention's unique single edge lit construction provide the means for achieving desired non-lambertian light distributions without need for conventional two lit edges and within a compact form factor with narrow width, particularly well-suited for linear lighting fixtures. Various embodiments also provide means for adjusting light distributions dynamically to control light output characteristics by controlling the input signals to the LED board included in the assembly.

BRIEF DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A and FIG. 3B combined are referred to as FIG. 3, a table listing some embodiments and their key characteristics.

DETAILED DESCRIPTION

Figure 1:
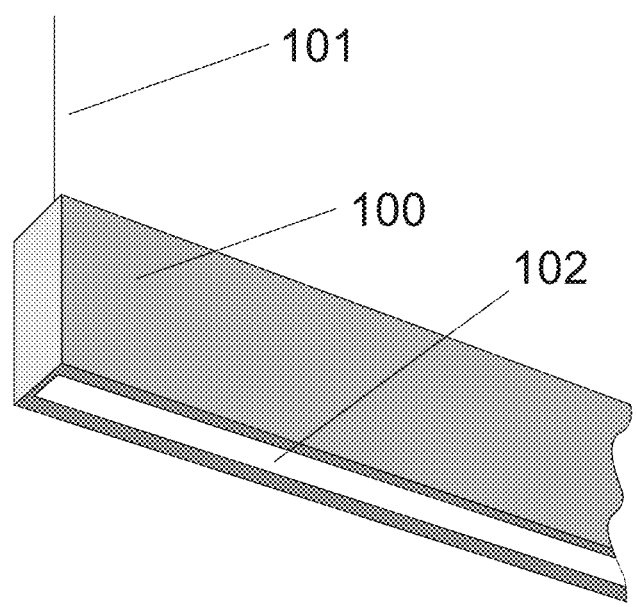
FIG. 1 is an isometric view of a light fixture with an embodiment lighting module.

FIG. 1 is an isometric view of an embodiment light fixture with an embodiment lighting module. The lighting module is contained within a housing 100 supported by a wire hanger 101. Light is transmitted from the fixture through a light fixture output face 102. This could be the output face of the lighting module or an optically transmitting component positioned over the lighting module output face such as a cover lens or a glare control film.

Figure 2:
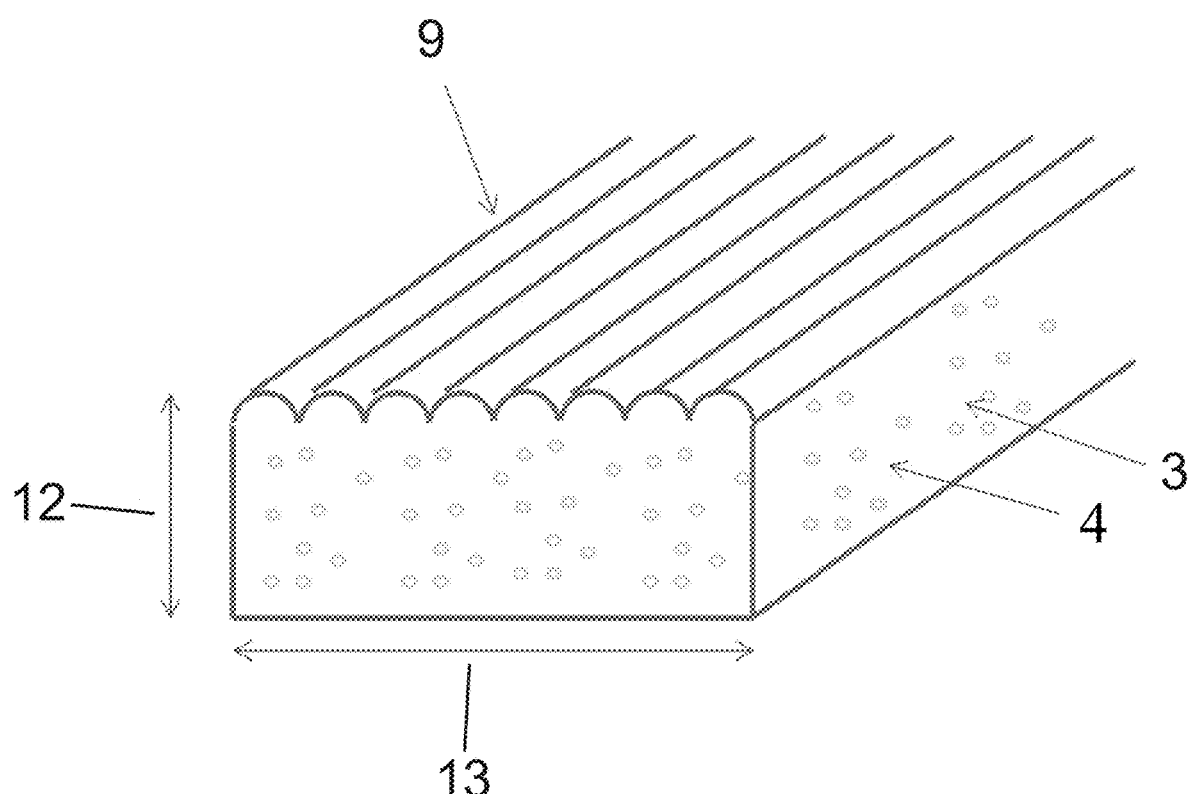
FIG. 2 is an isometric view of a light guide illustrating key elements.

FIG. 2 is an isometric view of a light guide illustrating key elements. Important to various embodiments are dimensions of width and height. Surface features and there pattern of arrangement on a face of the light guide are of importance in converting internal reflection within the light guide to output from the module at desired angular light distribution. Concentration of diffusing blend is an important variable in effecting light scattering properties that influence angular light distribution and uniformity of beam pattern. Volumetric light diffusion is produced by dispersed regions within the light guide having refractive index different than the bulk matrix material. Embodiments listed in the table of FIG. 3 include in the light guide formulation a specific commercially available diffusion resin, Plexiglas® Diffuse V045 blended into clear PMMA resin at the indicated weight percent within a range from zero to 20%. Alternative means in creating dispersed regions of differing refractive index from the light guide matrix material include dosing microbeads into the light guide resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light guides include extrusion and injection molding.

FIG. 3 is a table listing fabricated and tested light module embodiments and their key differentiating characteristics of light guide orientation, light guide height, light guide width, light guide surface feature geometry, bulk diffusion concentration, and reflector type.

Figure 4:
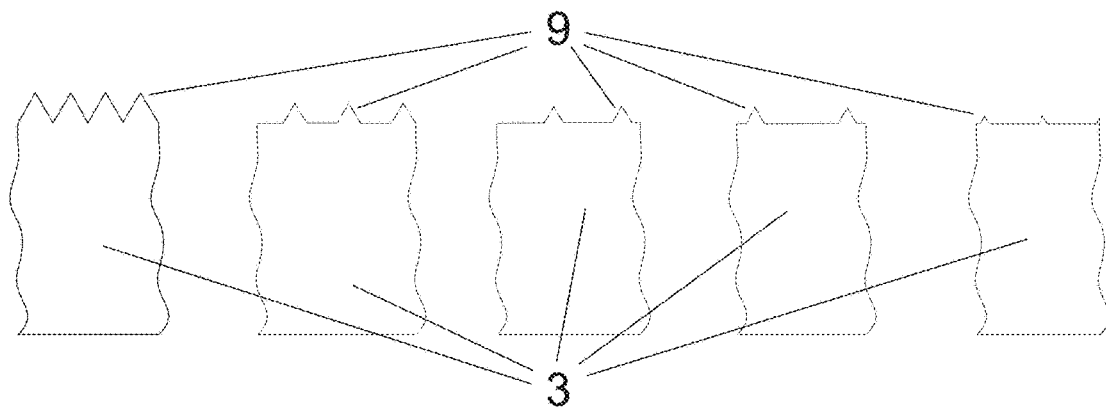
FIG. 4 illustrates various embodiment surface features.

FIG. 4 illustrates example embodiment surface patterns that have been developed to generate alternative beam output light distributions from light guide embodiments. These vary in both surface feature 9 size and shape as well as spacing of flat gaps between features and are labeled as SP1, SP2, SP3, SP4, and SP5. Alternative embodiments may utilize any variety of surface features that can be feasibly fabricated. Extrusion is a process in which lengths of light guide can be feasibly produced with patterns linear in the length dimension. In this case, prisms and lenticular designs can be readily produced. Asymmetric patterns including linear prisms with cross-sectional geometry of sawtooth triangles are also useful embodiments.

Figure 5:
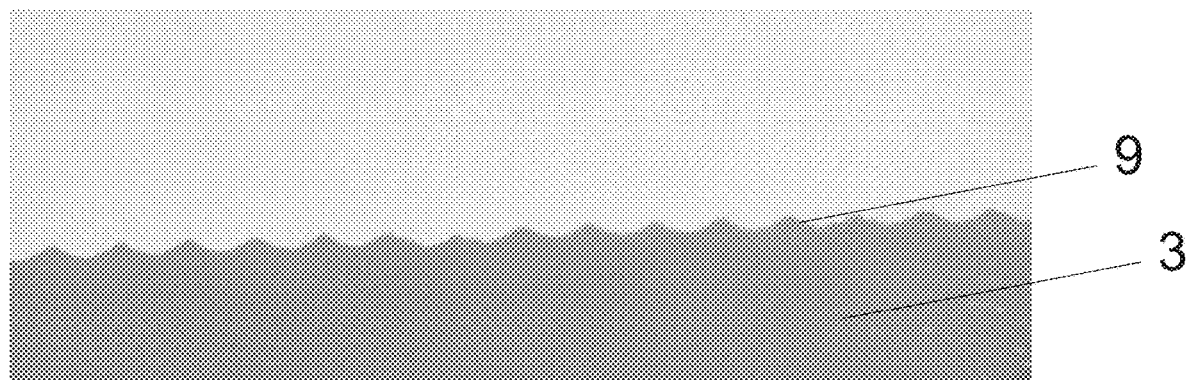
FIG. 5 is a photograph of a cross-section of the embodiment A light guide zoomed in on the surface features.

FIG. 5 is a photograph of a cross-section of the embodiment A light guide 3 zoomed in on the surface features 9. The features are fundamentally triangular prism lenticular with sides of the triangle being slightly concave.

Figure 6:
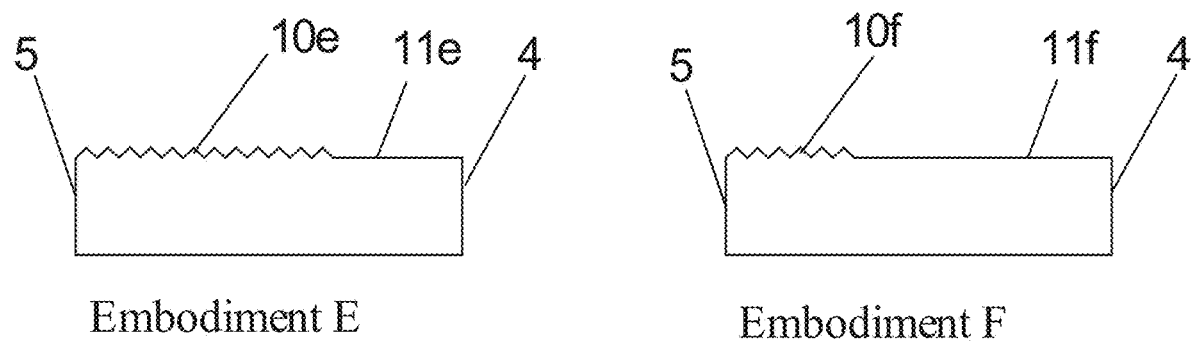
FIG. 6 shows cross-section views of light guide configuration of embodiments E and F.

FIG. 6 shows cross-section views of light guide configuration of embodiments E and F. The width of each light guide is 18 mm with 4.5 mm height. In embodiment E the first 6 mm of light guide surface adjacent to the input surface 4 has a flat surface and the next 12 mm of light guide surface 11e has a lenticular pattern 10e extending to the light guide opposing face 5.

Figure 7:
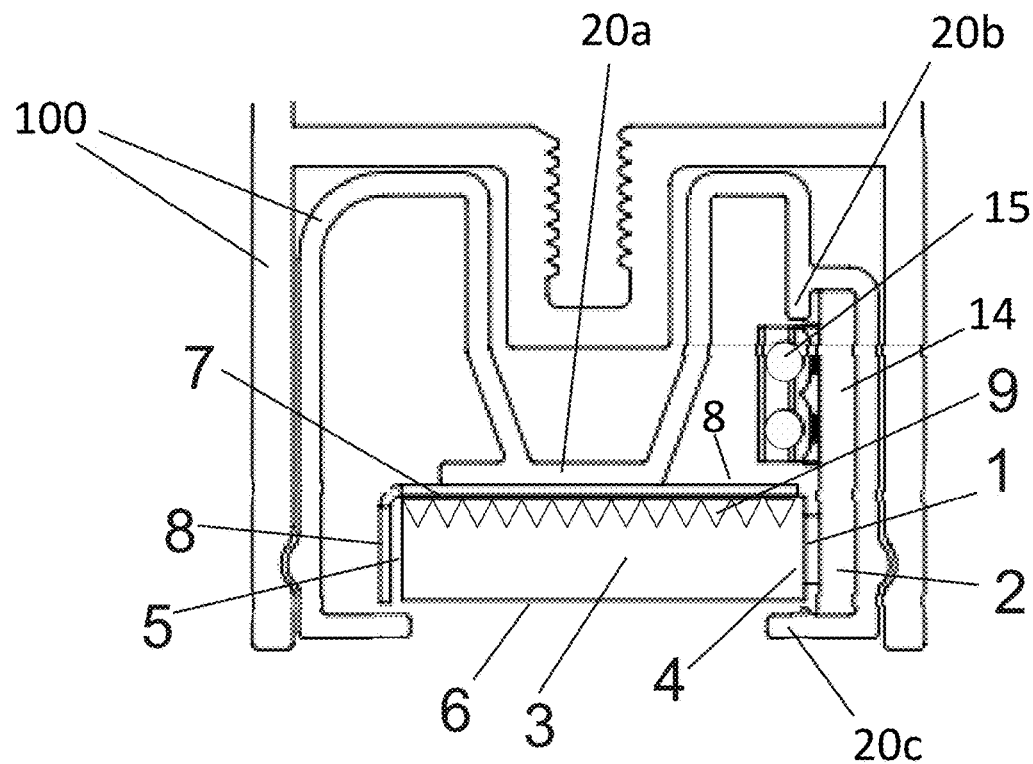
FIG. 7 is a cross-section view of lighting module embodiment A1.

FIG. 7 is a cross-section view of lighting module embodiment A1. The light source consists of individual light emitting diodes (LEDs) 1 mounted on an LED board 2 which is positioned adjacent to the light guide 3. Light emitted from the LEDs 1 enters the light guide through the light guide input face 4 and propagate through the light guide 3, partially internally reflecting from the faces of the light guide due to difference between the refractive index of the light guide and refractive difference of surrounding medium, typically air. Light guides typically comprise optically clear polymer or glass with high level of light transmission and refractive index greater than that of air which is 1.0. For example, polymethyl methacrylate (PMMA) is a common light guide material with refractive index of approximately 1.49. Some light does not internally reflect at the surface but rather escapes from the output face 6, typically with a light distribution centered at an angle less than 90 degrees from the output surface 6 and tilted away from the input face. Light that propagates through the light guide and exits through a light guide opposing face 5 is reflected back into the light guide by the reflector 8, the light guide opposing face effectively becoming in function a light guide input face. The reflector 8 wraps around both the light guide opposing face 5 and light guide inner face 7. Light that escapes the light guide 3 through the inner face 7 is reflected back into the light guide 3. For a reflector that is a specular reflector, light reflects back towards the light guide at the same angle from normal as light incident onto the reflector. Reflectors with a component of diffuse reflectance will produce more light scattering and a more dispersed light reflection.

The cross-section view of FIG. 7 shows as part of the LED board 2 a single LED 1 which is part of a linear array of light emitting diodes (LEDs) mounted on printed circuit board (PCB) 14. Also mounted on the printed circuit board is an electrical connector 15; in this embodiment mounted offset from the linear LED array so as to not interfere with linear LED array positioning immediately adjacent to the input face 4 of light guide 3. The LED board 2 and light guide 3 are retained in optical alignment by the housing 100. The housing additionally contains internal support feature 20a which aids in positioning and retention of the reflector 8. Internal support feature 20b aids in positioning and retention of the LED board 2. Internal support feature 20c functions as a support ledge in retaining in position the light guide 3 and LED board 2.

Figure 8:
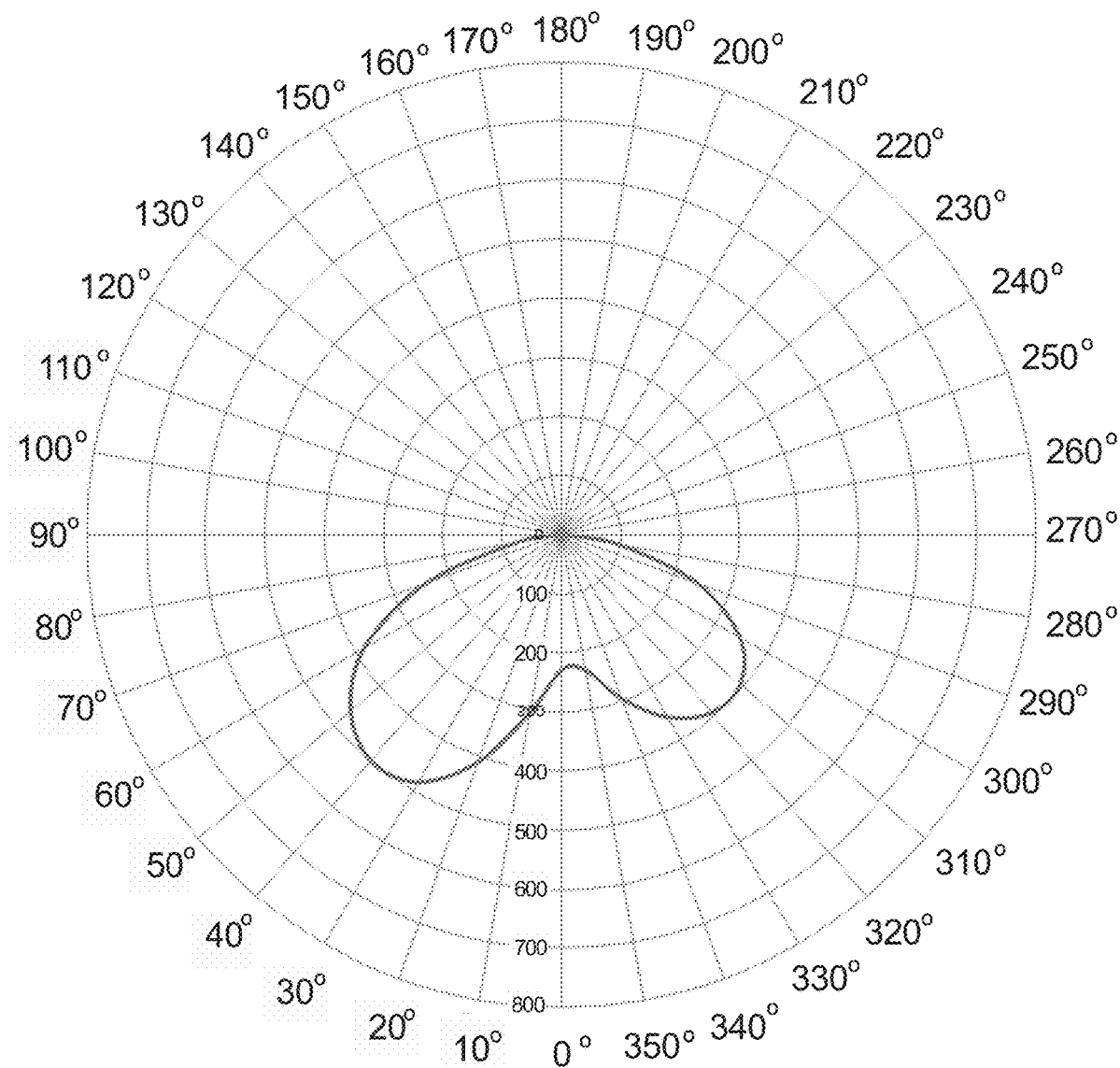
FIG. 8 is a polar plot showing cross-sectional angular light distribution of embodiment A1 lighting module.

FIG. 8 is a polar plot showing cross-sectional angular light distribution of embodiment A1 lighting module with surface features on the inner face of the light guide. The angular lobes are of a generally desirable bat wing type but the angular lobes are uneven and for most applications symmetric distribution would be preferred and specified.

Figure 9:
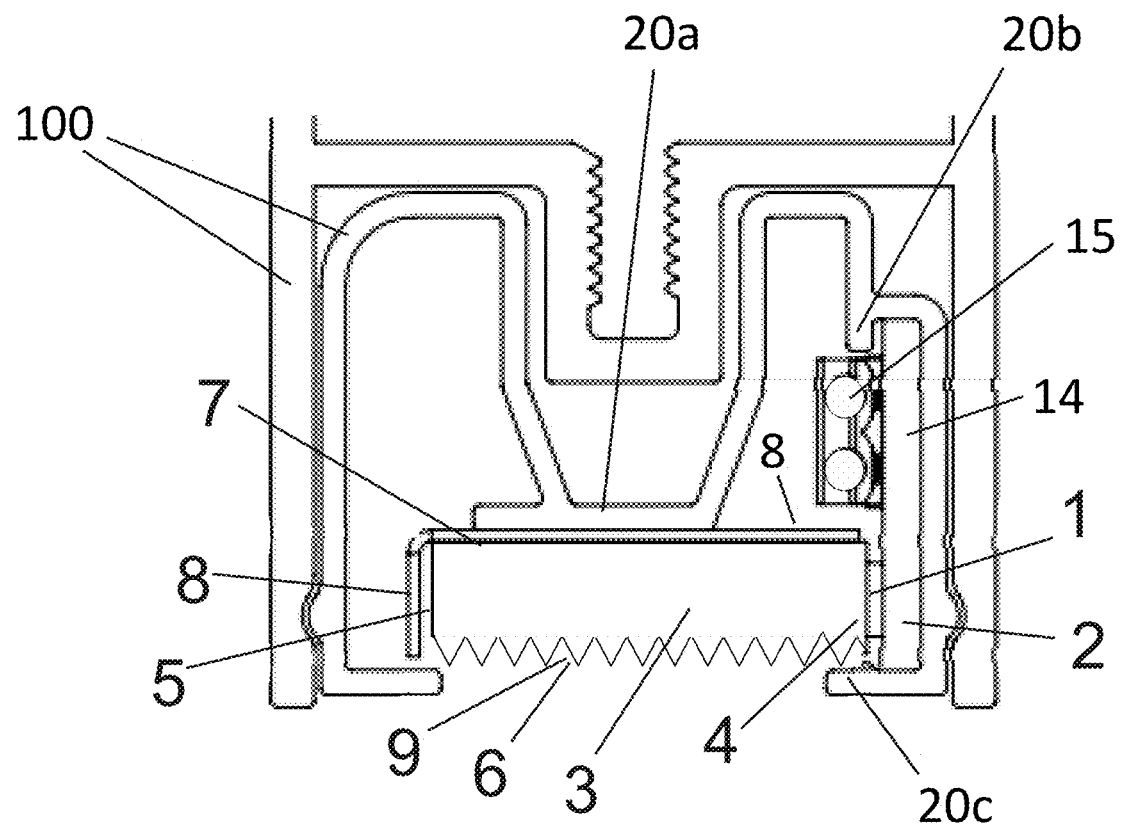
FIG. 9 is a cross-section view of lighting module embodiment A2.

FIG. 9 is a cross-section view of lighting module embodiment A2. This is the same as embodiment A1 except for the orientation of the light guide which has the surface features 9 positioned on the light guide output face 6 instead of on the light guide inner face 7.

Figure 10:
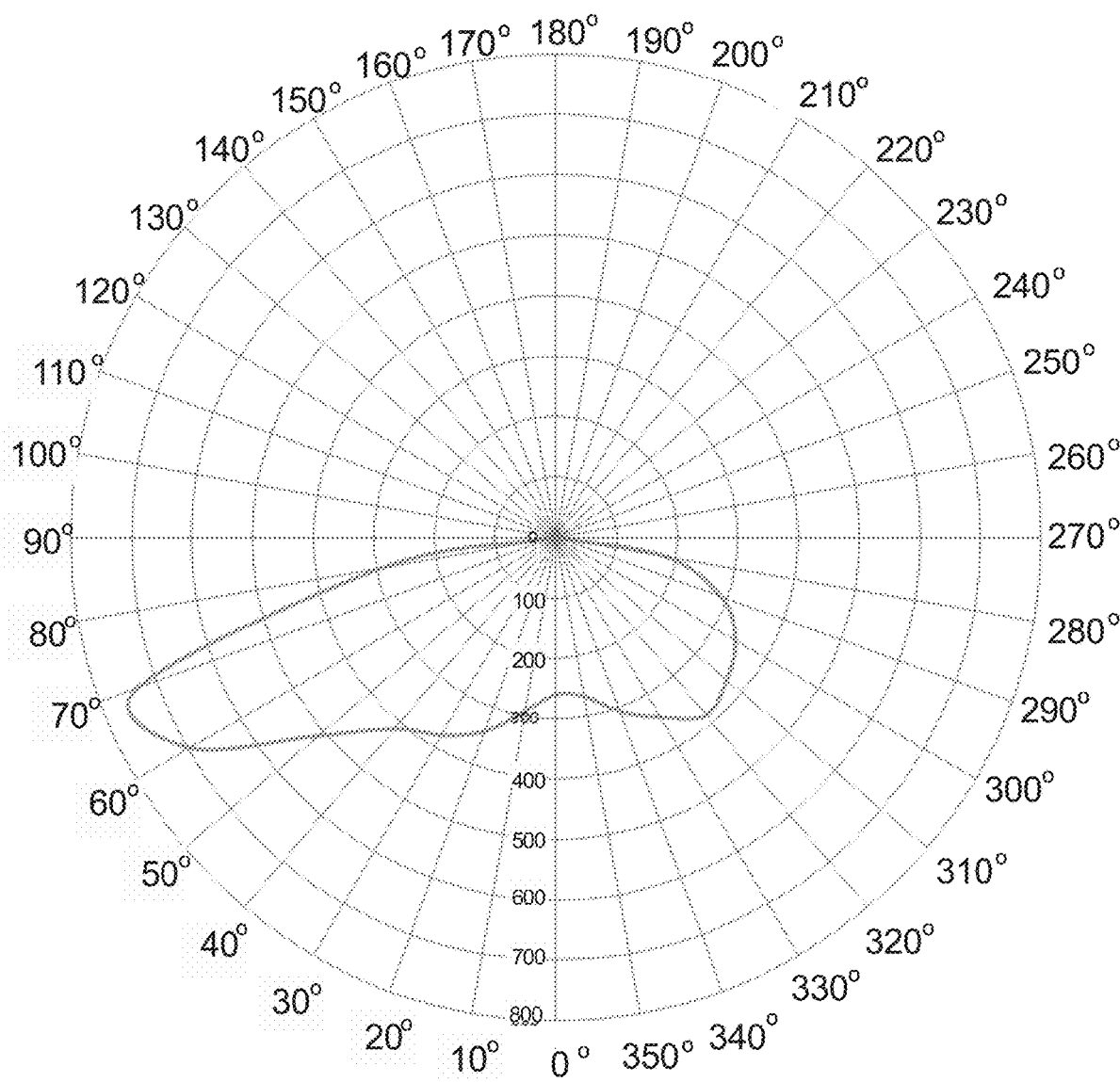
FIG. 10 is a polar plot showing cross-sectional angular light distribution of embodiment lighting module.

FIG. 10 is a polar plot showing cross-sectional angular light distribution of embodiment lighting module A2 with surface features on the output face of the light guide. The angular light distribution is more asymmetric with light emitted less normal to the output surface than embodiment A1 which has the light guide orientation reversed.

Figure 11:
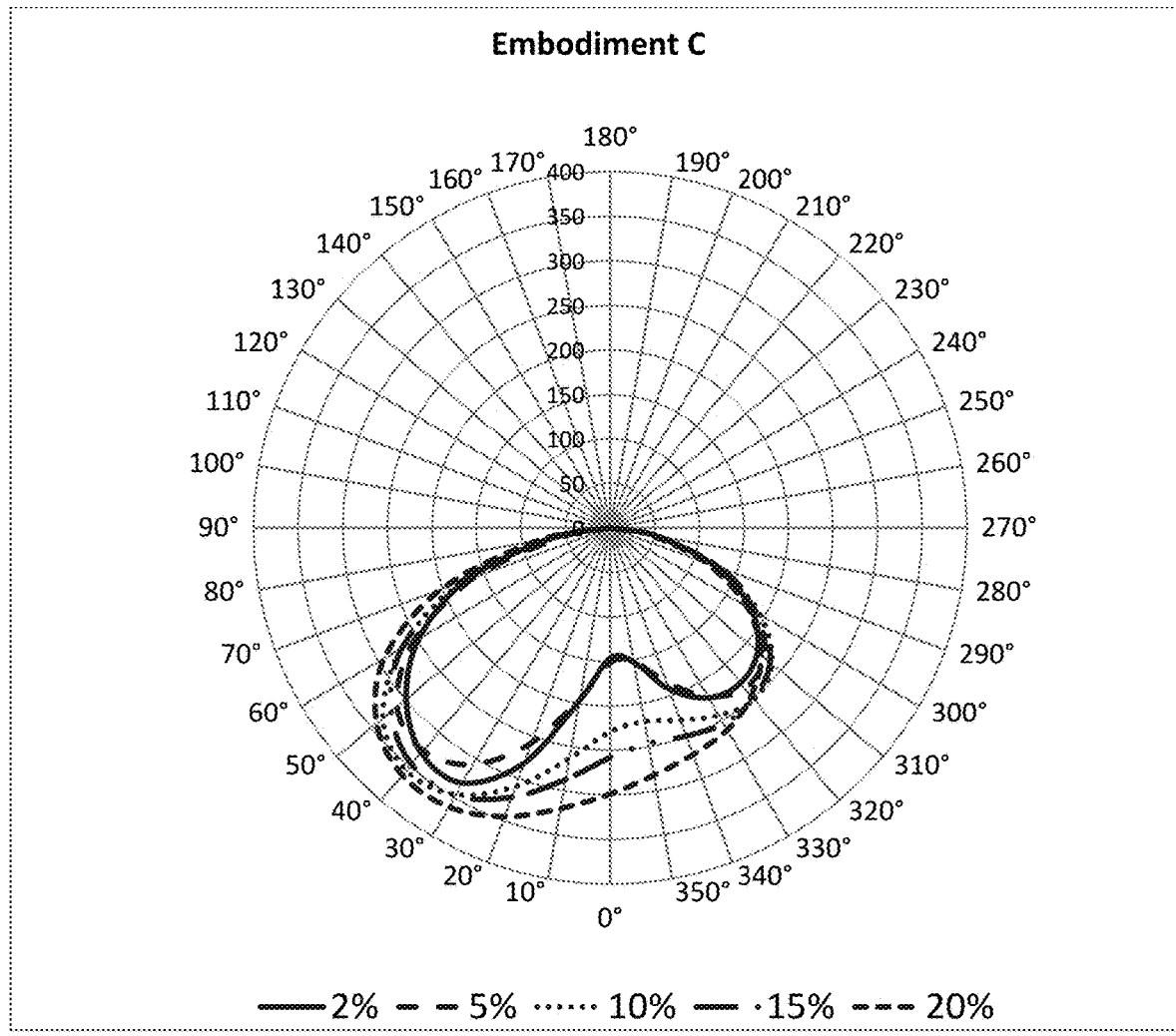
FIG. 11 is a polar plot relating to embodiment C and demonstrates effect of diffusion concentration on cross-sectional angular output.

FIG. 11 is a polar plot relates to embodiment C and demonstrates effect of diffusion concentration on cross-sectional angular output. Increasing diffusion concentration results in more overall output but less distinct bat wing lobes.

Figure 12:
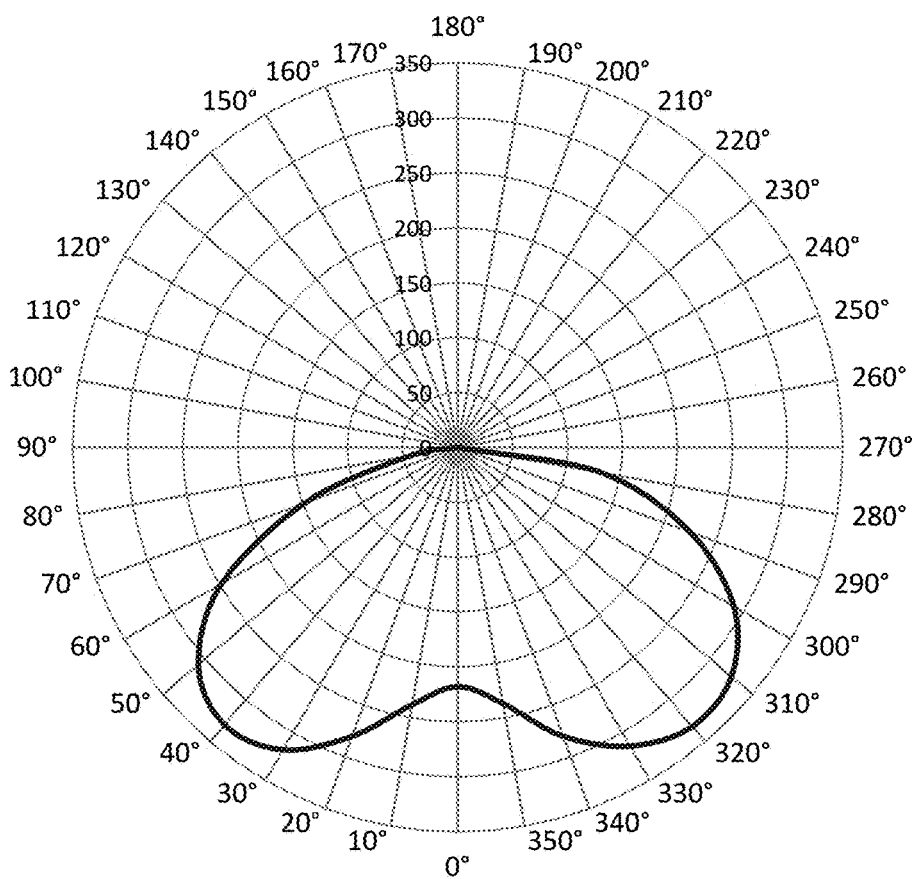
FIG. 12 is a polar plot demonstrating the cross-sectional angular output of embodiment module D showing symmetric batwing light distribution.

FIG. 12 is a polar plot demonstrating the cross-sectional angular output of embodiment module D showing symmetric batwing achieved with a light source input into only one face of a light guide. The batwing light distribution is desirable in many downlighting applications as it provides even illumination when projected onto flat surfaces such as floors and tables. To achieve this light distribution through a light guide with only one light source instead of the customary two provides reduced cost and a more narrow compact form factor.

Figure 13:
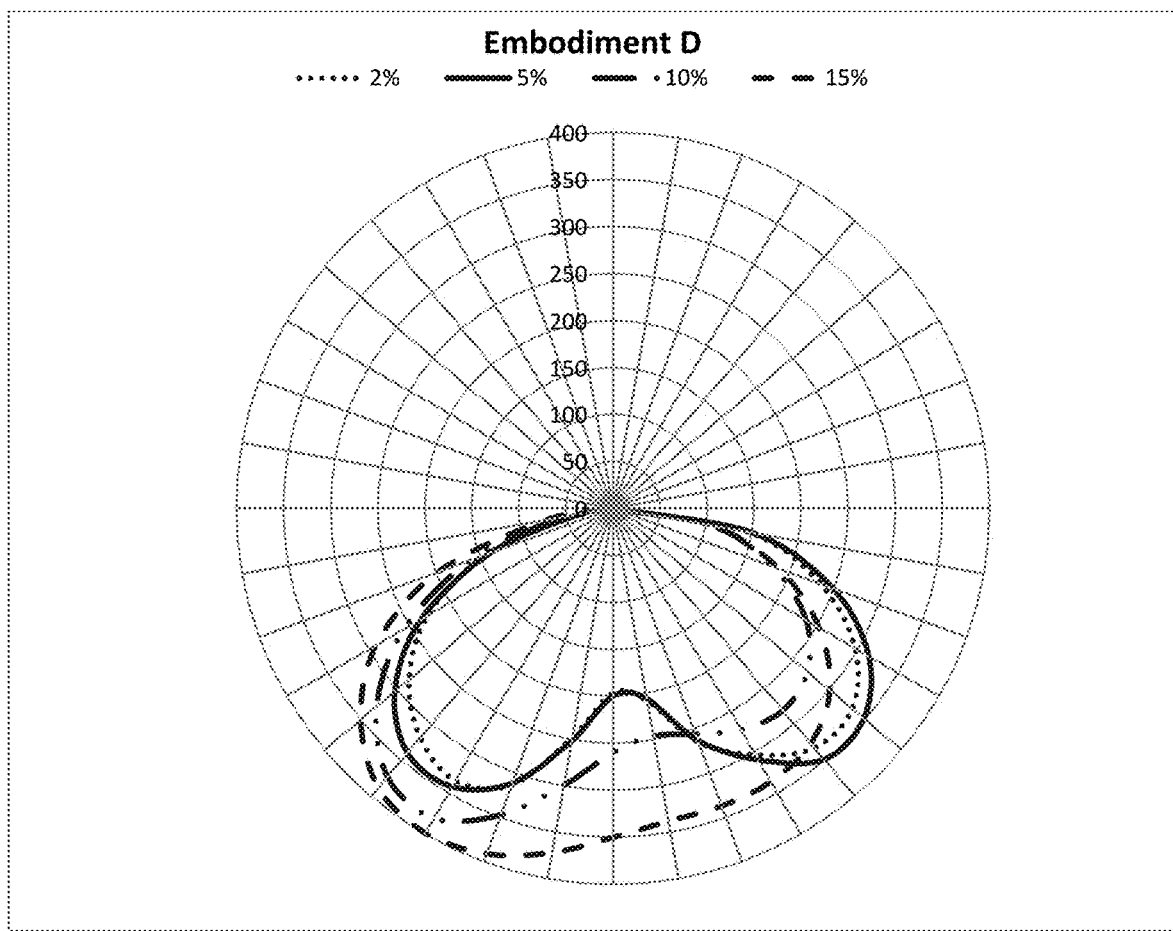
FIG. 13 is a polar plot demonstrating the cross-sectional angular output of embodiment module D with different diffusion levels.

FIG. 13 is a polar plot demonstrating the cross-sectional angular output of embodiment module D with different diffusion levels. The plots show the trends of increased luminous output and decreased angular asymmetry with increasing diffusion amount. The increased diffusion amount increases light scattering and the proportion of light which contacts a face of the light guide at an angle exceeding the critical angle of reflection thus exiting the light guide and not internally reflecting inside the light guide.

Figure 14:
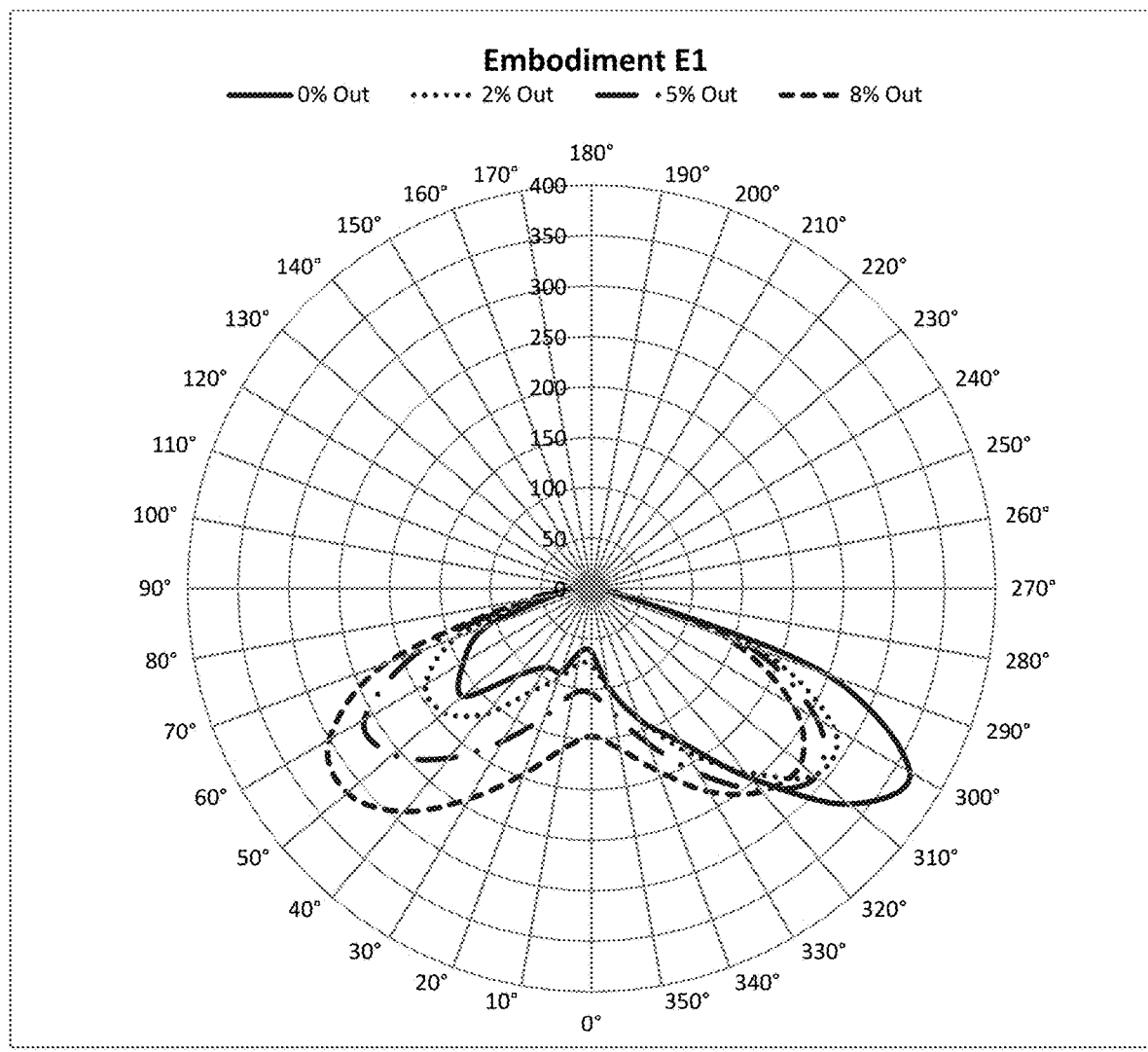
FIG. 14 is a polar plot demonstrating the cross-sectional angular output of embodiment module E1 with 12-6 light guide surface pattern on output face.
Figure 15:
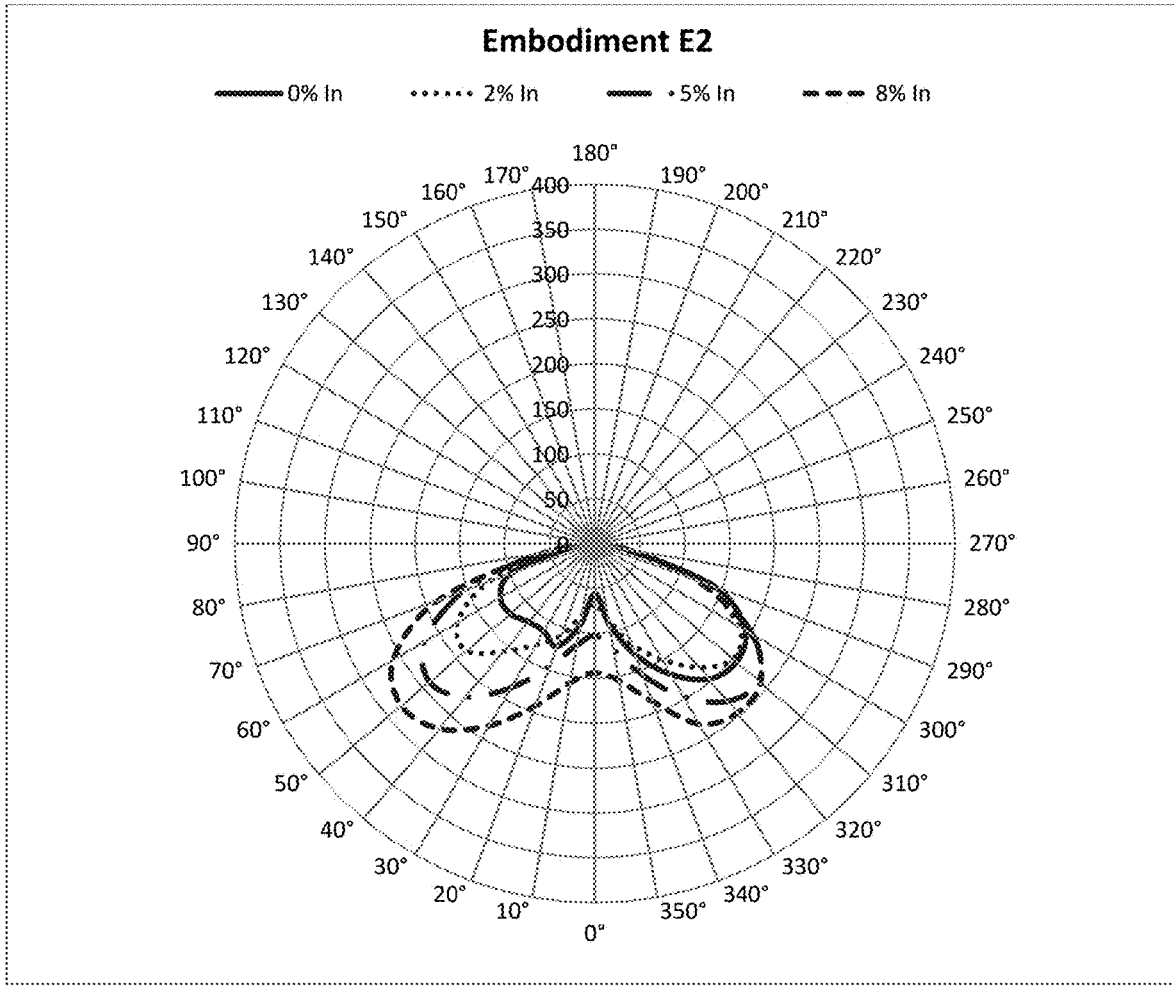
FIG. 15 is a polar plot demonstrating the cross-sectional angular output of embodiment module E2 with 12-6 light guide surface pattern on inner face.

FIG. 14 and FIG. 15 are polar plots demonstrating the cross-sectional angular output of embodiment module E with the surface patterned face of the light guide as the output face (E1—FIG. 14) and inner face (E2—FIG. 15). In this embodiment the light guide has a pattern of surface lenticular area as illustrated as "Embodiment E" in FIG. 6. The light guide has a total width of 18 mm having on one 18 mm wide face an area of flat surface 6 mm wide and an area of lenticular pattern 12 mm wide. All plotted data is from testing done with the flat area of the patterned face adjacent to the input face of the light guide and the lenticular surface area positioned adjacent to face of the light guide opposing the input face. The plots show light distribution results with patterned lenticular face that are significantly different from and useful in a different manner than results from the full surface lenticular of embodiments A-D. In embodiments A-D the light distribution output in all cases is asymmetric with a larger lobe in the direction away from the light guide input face. In embodiment E the larger lobe of asymmetric output is in the direction toward the input light guide face. As diffusion level within the light guides of embodiment E is increased, the light distribution shifts more away from the input face of the light guide. With increasing diffusion level, there is a level where there is a net balance of surface feature and volumetric diffusion that results in a balanced bat wing type light distribution having lobes of light distribution that are largely symmetric and similar. For embodiment E this diffusion level appears by interpolation of FIG. 14 and FIG. 15 plots to be somewhere between 5% and 8%.

Figure 16:
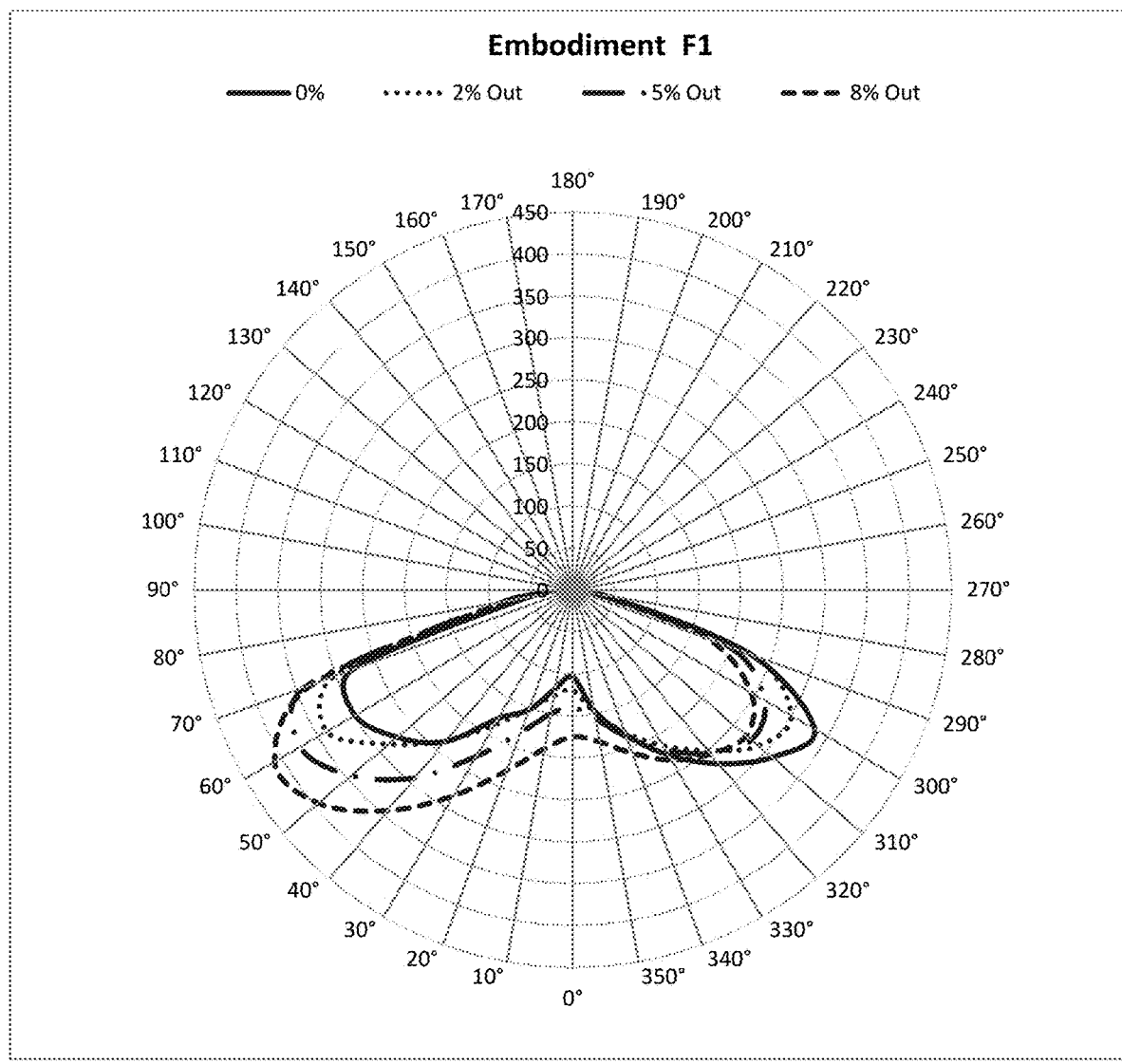
FIG. 16 is a polar plot demonstrating the cross-sectional angular output of embodiment module F1 with 6-12 light guide surface pattern on output face.
Figure 17:
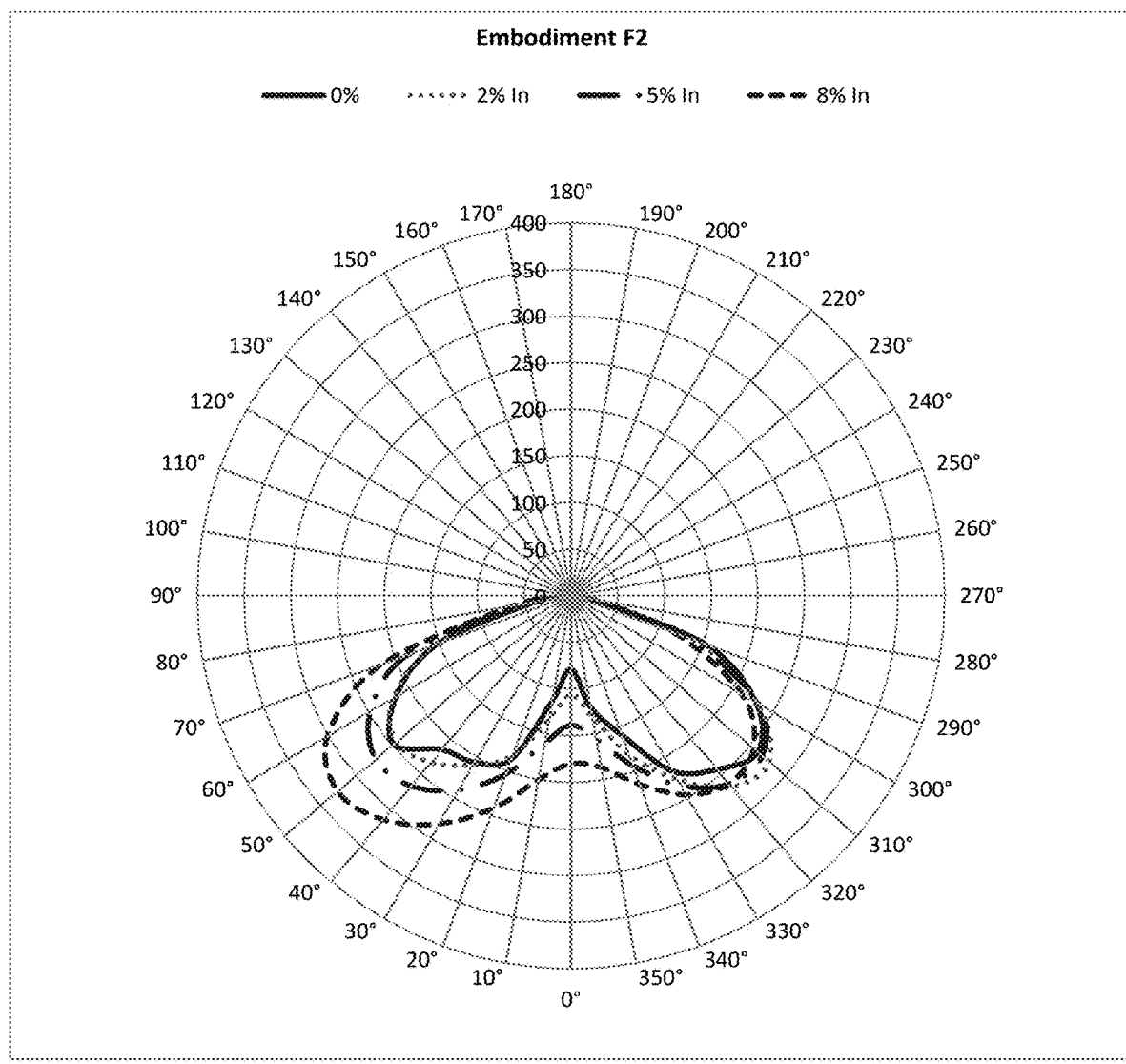
FIG. 17 is a polar plot demonstrating the cross-sectional angular output of embodiment module F2 with 6-12 light guide surface pattern on inner face.

FIG. 16 and FIG. 17 are polar plots demonstrating the cross-sectional angular output of embodiment module F with the surface patterned face of the light guide as the output face (F1—FIG. 16) and inner face (F2—FIG. 17). In this embodiment the light guide has a pattern of surface lenticular area as illustrated as "Embodiment F" in FIG. 6. This light guide is similar to embodiment E but the patterned surface is changed to have 12 mm of flat surface area width and 6 mm of lenticular surface area as compared to 6 mm flat and 12 mm lenticular surface areas of embodiment E. As evidenced by the light distribution polar plots in FIG. 16 and FIG. 17, the degree of light output oriented toward the light guide input face is reduced in embodiment F vs. embodiment E, apparently due to the reduced area of lenticular on the patterned surface. This indicates that the percentage of surface pattern with light redirecting feature chosen can be used to adjust the light distribution and achieve targeted outcomes such as batwing light distribution.

Figure 18:
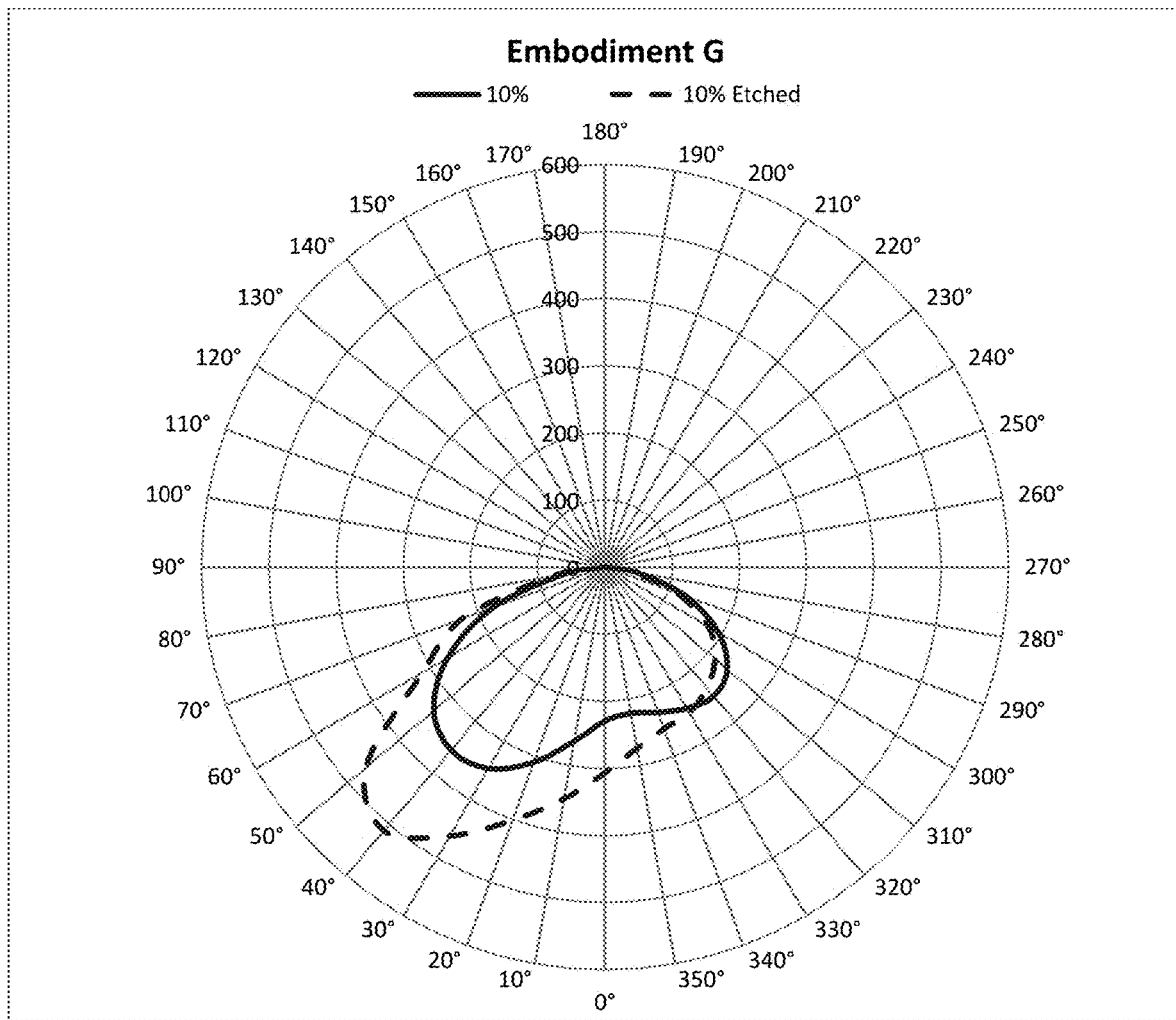
FIG. 18 is a polar plot illustrating the increased cross-sectional asymmetric angular output of embodiment module G having an etched light guide surface.

FIG. 18 is a polar plot illustrating the increased cross-sectional asymmetric angular output of embodiment module G having an etched light guide surface. Compared to a non-etched surface the output is greater.

LIST OF NUMERICAL REFERENCES

1 LED
2 LED board
3 Light guide
4 Light guide input face
5 Light guide opposing face
6 Light guide output face
7 Light guide inner face
8 Reflector
9 Surface Features
10 Lenticular surface
11 Flat surface
12 Height
13 Width
14 Printed Circuit Board
15 Electrical Connector
20a Internal Support Feature
20b Internal Support Feature
20c Internal Support Feature/Support Ledge
100 Housing
101 Wire hanger
102 Light fixture output face

What is claimed is:

1. A light fixture comprising:
a) a linear housing having a three-dimensional form of a cross-sectional profile area extended linearly in an orthogonal longitudinal direction to form an extended cross-sectional profile area which further comprises internal support features;
b) at least one LED board comprising at least one LED mounted onto a printed circuit board (PCB);
c) a light guide comprised of optically transmissive bulk material containing either light scattering regions or surface features or both and further comprising;
   i) a single input face;
   ii) an opposing face non-adjacent to the input face;
   iii) an inner face adjacent to the input face;
   iv) an outer face adjacent to the input face;
d) at least one reflector positioned external of the light guide and proximate to the light guide inner face or opposing face wherein light exiting the light guide is reflected back into the light guide from the at least one reflector;
e) an optically transmitting component with an inner input face and an outer output face;
wherein the linear housing holds in position and retains in optical alignment the at least one LED board, the light guide and the reflector with an outer face of the LED, wherein the outer face of the LED is proximate to the single input face of the light guide, and the inner input face of the optically transmitting component is positioned over the light guide outer face and the outer output face of the optically transmitting component is functioning as an output face of the light fixture and;
wherein light output from the light guide outer face is non-lambertian with at least one intensity peak oriented in a non-normal direction to the light guide outer face and is subsequently transmitted through the optically transmitting component.

2. The light fixture of claim 1 wherein the internal support features are integral to the extended cross-sectional profile area.

3. The light fixture of claim 2 wherein one of the internal support feature is a support ledge that supports the light guide and LED board preventing either from falling out of the light fixture when suspended vertically.

4. The light fixture of claim 2 wherein a back of reflector and front of light guide are retained in a configured spacing between support features.

5. The light fixture of claim 4 wherein the reflector and light guide are retained in a horizontal orientation when the light fixture is suspended vertically.

6. The light fixture of claim 1 wherein the LED board further comprises at least one electrical connector mounted onto the PCB.

7. The light fixture of claim 6 wherein the electrical connector is held in position at a different height than the at least one LED.

8. The light fixture of claim 6 further comprising a linear array of LEDs wherein the electrical connector is not mounted in line with the linear array of LED light sources.

9. The light fixture of claim 1 wherein the LED board is retained vertically and the light guide is retained horizontally.

10. The light fixture of claim 1 wherein the optically transmitting component is horizontal and parallel with the light guide when retained in position by the linear housing.

11. The light fixture of claim 1 wherein a lighting distribution from the output face of the light fixture is different to a lighting distribution from the outer face of the light guide.

12. The light fixture of claim 1 wherein a lighting distribution from the output face of the light fixture is non-lambertian with at least one intensity peak oriented in the non-normal direction to the light guide outer face.

13. The light fixture of claim 1 wherein a lighting distribution from the output face of the light fixture is bi-lobed with two distinct peak intensities.

14. The light fixture of claim 1 wherein a lighting distribution from the output face of the light fixture has a single peak intensity.

15. The light fixture of claim 1 wherein the optically transmitting component is a cover lens or glare control film.

16. The light fixture of claim 1 wherein the reflector is replaceable by an internal reflective surface of the linear housing.

17. The light fixture of claim 1 wherein the reflector is a specular reflector.

18. The light fixture of claim 1 wherein the reflector has a component of diffuse reflectance.

19. The light fixture of claim 1 wherein the reflector is a single reflector that is proximate to and wraps around the inner and opposing faces of the light guide.

20. The light fixture of claim 1 additionally comprising a means of suspension.

21. The light fixture of claim 20 wherein the means of suspension is a wire hanger.

22. The light fixture of claim 1 used to illuminate a wall, ceiling or floor.

23. The light fixture of claim 1 wherein the linear housing is oriented to produce mostly downlight.

24. The light fixture of claim 1 wherein the linear housing is oriented to produce mostly uplight.

25. The light fixture of claim 1 wherein the light fixture is of a type selected from the group consisting of linear, suspended, and downlight.

26. The light fixture of claim 1 wherein a lighting distribution from the light fixture is selectively chosen by orientation of the light guide with respect to a reflective surface of the reflector.

27. The light fixture of claim 26 wherein the inner face has surface features.

28. The light fixture of claim 26 wherein the outer face has surface features.

29. The light fixture of claim 26 wherein either the inner face or outer face of the light guide is etched.

30. The light fixture of claim 1 wherein the linear housing is produced by profile extrusion.

31. The light fixture of claim 1 wherein a combination of the LED board, light guide, reflector, and a lighting module housing are positioned and retained in optical alignment with each other and the combination as a whole is retained in place within the light fixture.

32. The light fixture of claim 31 wherein the lighting module housing is retained in place by mating features in both the linear housing of the light fixture and the lighting module housing.

* * * * *